July 29, 1958 C. O. FINN 2,844,914
NOZZLE ASSEMBLY FOR MULCH SPREADERS AND THE LIKE
Filed Sept. 24, 1956 2 Sheets-Sheet 1
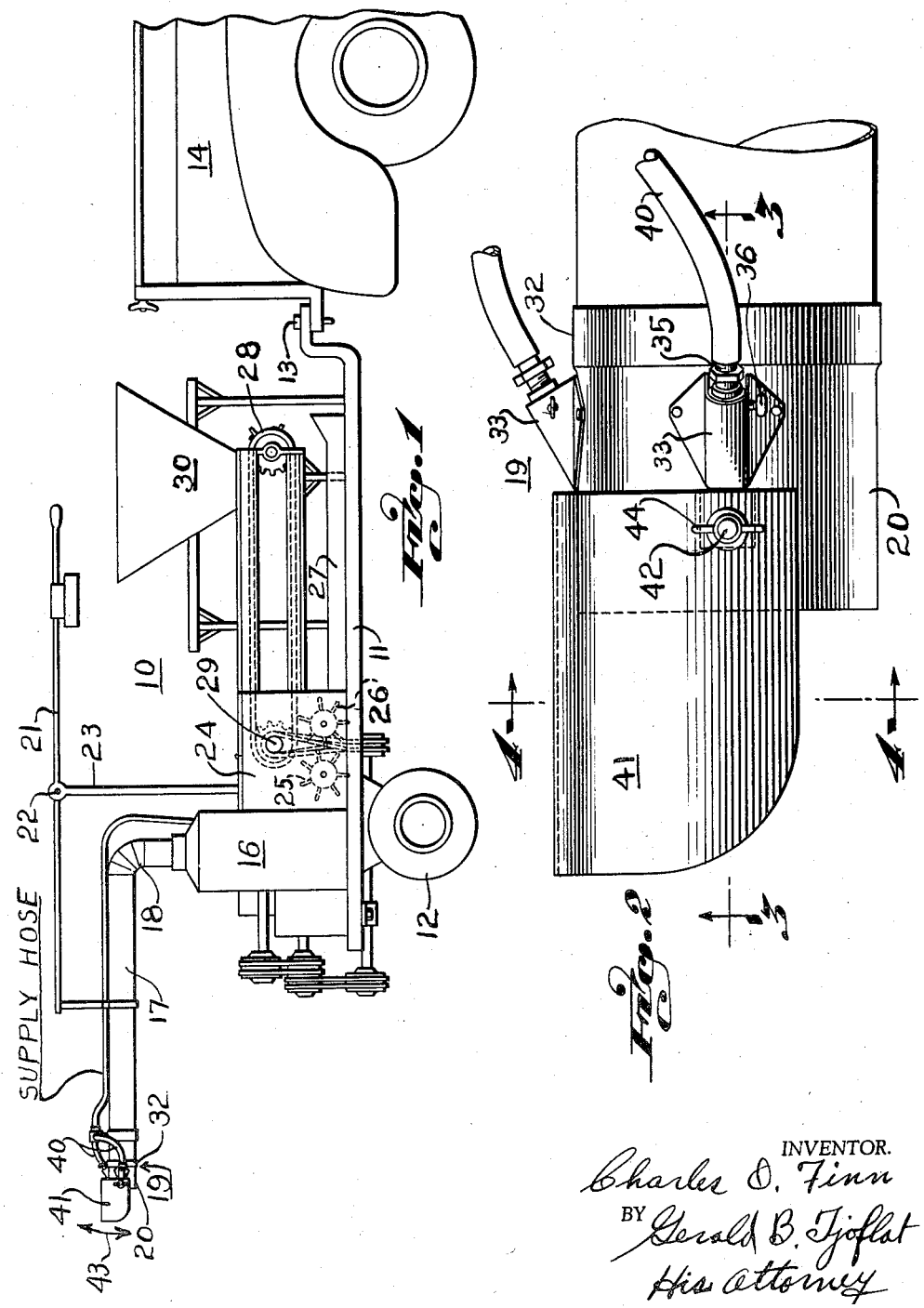
INVENTOR.
Charles O. Finn
BY Gerald B. Tjoflat
His Attorney July 29, 1958            C. O. FINN            2,844,914
NOZZLE ASSEMBLY FOR MULCH SPREADERS AND THE LIKE
Filed Sept. 24, 1956            2 Sheets-Sheet 2
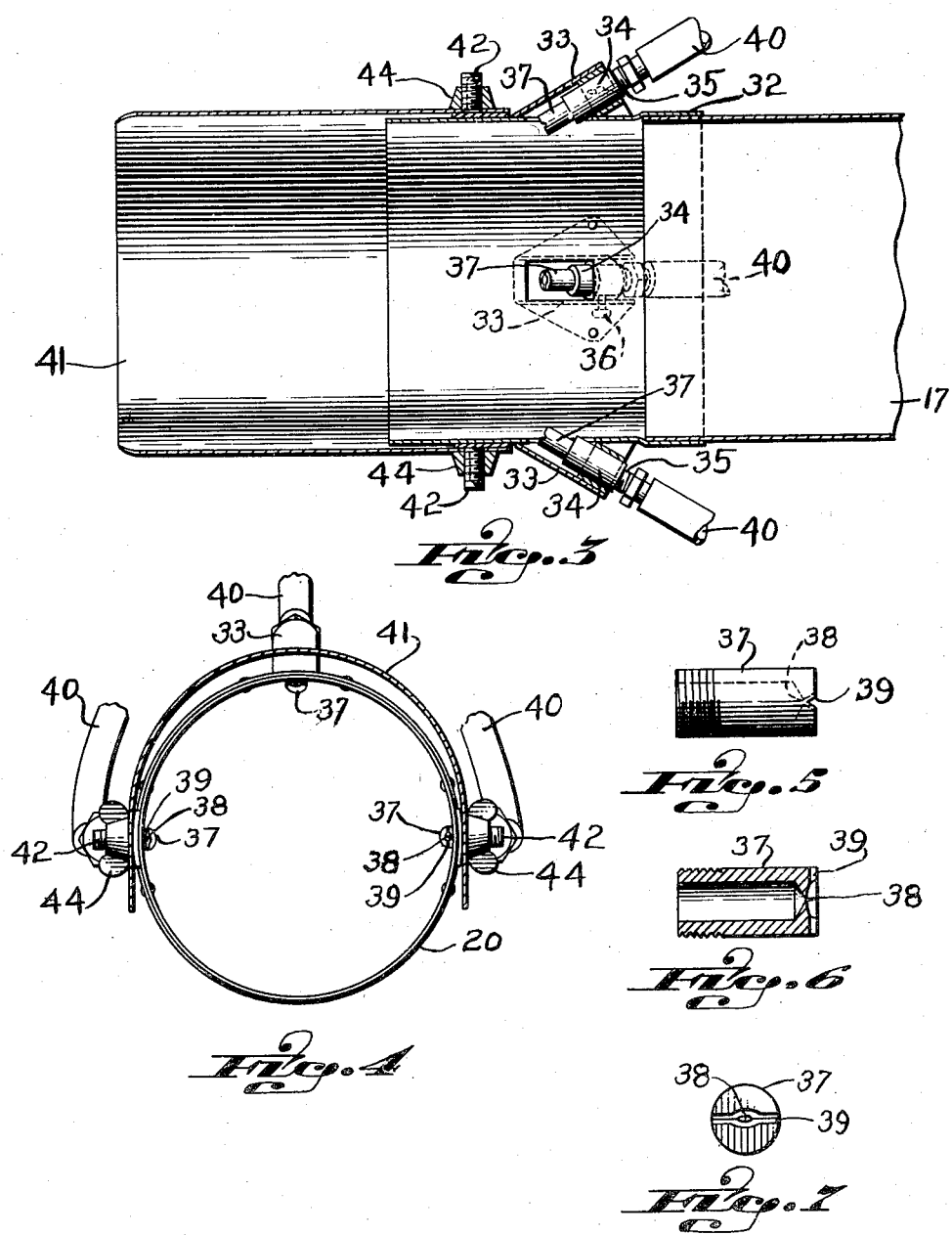

United States Patent Office 2,844,914
Patented July 29, 1958

2,844,914

NOZZLE ASSEMBLY FOR MULCH SPREADERS AND THE LIKE

Charles O. Finn, Cincinnati, Ohio, assignor to The Finn Equipment Company, Cincinnati, Ohio, a corporation of Ohio Application September 24, 1956, Serial No. 611,666

6 Claims. (Cl. 47—9)

This invention relates to blower pipes for mulch spreaders and the like and more particularly to nozzle assemblies for the discharge ends of such pipes for producing a fog of adhesive by which the mulch fibres are tacked together by spots of adhesive thereon. The nozzle arrangement may also be used to develop a fog or fine spray of liquid for wetting materials other than fibres when blown through a spreader pipe.

This application relates to the subject matter of my copending applications Serial No. 373,563, filed August 11, 1953, and Serial No. 416,812, filed March 17, 1954, and is a continuation-in-part of those applications as to common subject matter.

An object of this invention is to provide an improved nozzle assembly for the discharge ends of mulch blower pipes whereby an adhesive may be more effectively converted into a fog and spotted on the surfaces of fibres and particles as they are discharged by the blower, the nozzle assembly being also utilizable for generating a fog or spray of water or the like for wetting materials other than fibres blown out through the blower pipe.

Another object of the invention is to provide an attachment for the discharge end of a mulch spreader blower pipe, having an improved arrangement of nozzles whereby a fog of adhesive or water, as the case may be, may be effectively generated for coating fibres and other materials issuing from the blower pipe.

A still further object is to provide a nozzle assembly having an adjustable deflector means whereby the area covered by the adhesively spotted fibres or other materials may be effectively controlled.

The above and other objects and advantages will be apparent to those of ordinary skill in the art to which the invention pertains from the following specification and drawings.

In the drawings:

Figure 1 is a more or less schematic view of a mulch spreader provided with a blower pipe having a nozzle assembly embodying a form of the invention, and a part of a towing truck or tractor to which the spreader is coupled;

Fig. 2 is an enlarged view of the nozzle assembly for the blower pipe shown in Fig. 1, and a deflector for controlling the areas to be covered by materials discharged by the blower pipe;

Figs. 3 and 4 are views in section taken on lines 3—3 and 4—4, respectively, of Fig. 2;

Fig. 5 is a view in elevation of a nozzle embodied in Figs. 1, 2, 3 and 4;

Fig. 6 is a view of the nozzle of Fig. 5 in longitudinal section; and

Fig. 7 is a view in elevation of the discharge end of the nozzle.

In Fig. 1 of the drawings a mulch spreader 10 is shown that comprises a chassis 11 mounted at the rear on wheels 12 and coupled at the front by a coupling 13 to a truck or tractor 14.

The chassis 11 carries a power driven blower 16 having a blower pipe 17 connected to the outlet thereof by means of a universal swivel or elbow 18. Fibres, such as straw, hay or the like, or other materials, to be described infra, are propelled in a strong swiftly moving current of air through the pipe 17 and discharged over the soil areas to be covered. As disclosed in my aforementioned applications, the fibres or other materials discharged by the blower pipe 17 are tacked together with adhesive spotted on the surfaces of the fibres or other material. The adhesive is discharged as a fog into the materials as they leave the discharge end of the blower pipe. If water or other liquid is used instead of adhesive, these nozzles form a fog or fine mist or spray of the same.

In the arrangement shown in Fig. 1, a nozzle assembly 19 is provided at the discharge end of pipe 17. It is so constructed that the adhesive fog or liquid spray is developed within a nozzle housing 20 where it can efficiently spot or wet the fibres or other materials before they are discharged into the atmosphere. The details of the nozzle assembly shown in Figs. 2 to 7 will be described infra.

The blower pipe 17 may be manually rotated and lowered or elevated by means of a counter weighted lever 21 which is pivoted at 22 on a rotatable standard 23. By means of the lever 21, an operator riding on the chassis may give controlled direction to the material that issues from the blower pipe.

At the inlet to the blower is a housing 24 in which beaters 25 and 26 are rotatably mounted. These beaters break up bales of straw (not shown) or other fibre as they are fed to the same along a platform 27. A supply of these bales may be carried by the tractor 14.

The particular spreader shown may also be used to spread particulate material such as sand, fertilizer, lime, cement or other materials or mixtures thereof. Such material may be delivered to the blower inlet by means of an endless belt 28, the front end of which is pivotally mounted on the front conveyor sprocket shaft 29, the ends of which are journaled in the beater housing 24. The back end of the conveyor 28 is provided with a hopper 30 into which the particulate material is dumped by the workmen. The material flows by gravity to the conveyor belt 28 which carries it to the inlet of the blower. As shown, the conveyor belt may be belt driven from the same source that drives the blower.

Since the conveyor is pivoted at the front end on shaft 29, the rear end may take the position shown or it may be raised, in which case it is rotated counterclockwise, to a position where it sufficiently clears the platform 27 so as not to interfere with the sliding of bales of fibre to the beaters 25 and 26.

Basically, the structure described above is shown in my application supra.

The materials discharging from the blower pipe 17 may be wetted with water or an adhesive such as an asphalt emulsion. If only a fibre mulch is to be spread over the ground—usually barren or eroded areas—an asphalt emulsion is spotted on the surface of the fibres by the nozzle assembly 19. The arrangement of the nozzle assembly and the details thereof are shown in Figs. 2 to 7, inclusive.

As shown in Figs. 2 to 7, the nozzle assembly comprises the housing 20 which may be a relatively short piece of pipe, having a flange 32 at its inner end for receiving the discharge end of the blower pipe 17 and to which it may be secured by any suitable means not shown.

The section 20 is provided with a plurality of preferably uniformly spaced nozzle holders 33 mounted on the outside of the housing 20 and suitably secured thereto. The spacing between the holders 33 as shown is approximately 90 degrees, the middle holder being on the top of the housing 20. The holders are disposed at an acute angle to the longitudinal axis of housing 20 so that the axes of the hollows thereof are inclined forwardly of and towards the center of the section 20. Each holder is provided with a relatively short internally threaded pipe coupling 34 into which a hose coupling 35 may be threaded. The couplings 34 are detachably secured to the holders 33 with screws 36. Each holder 33 is also provided with a nozzle 37 that is screwed into the outlet end of coupling 34.

As shown in Figs. 5, 6 and 7, the discharge end of each nozzle 37 is provided with an orifice 38, preferably of oval shape, and a transverse slot 39 extending across the face of the end of the nozzle. The slot is preferably of V-shape and so positioned that the apex thereof is colinear with the major axis of the orifice. Adhesive or other liquid is supplied under pressure to the nozzles by means of hoses 40 which are connected to a suitable pump not shown.

By arranging the nozzles as shown, the adhesive or other liquid issuing therefrom is converted into a fog that permeates uniformly and thoroughly the entire flow area of nozzle housing 20, particularly the central portion thereof where the density of the flow of air which carries the fibres or other materials, is the greatest. Furthermore, the nozzle holder construction facilitates the changing or cleaning of nozzles.

In order to provide for controlling the direction of discharge of the material issuing from the nozzle housing 20, the nozzle assembly is provided with a deflector 41. The deflector is supported on trunnions 42 located on opposite sides of the housing 20 so that it may be rotated on the same along the arc 43 as shown in Fig. 1. The deflector can be secured in any position to which it is adjusted by means of wing nuts 44 threaded on the trunnions.

When the areas to be covered are at a substantial distance from the spreader, the deflector 41 may take the position shown in which case the pipe 17 is raised or lowered as required by the circumstances. If the areas to be covered are close to the machine, as for example where the berm of a highway is to be covered, the deflector 41 is rotated downwardly to a position where the fibres or other material will be discharged upon the berm as required without wasting material on other areas. The deflector is then locked in its adjusted position with the wing nuts.

Having thus described the invention, it will be apparent to those of ordinary skill in the art to which the same pertains, that various modifications and changes may be made without departing from either the spirit or the scope thereof.

Therefore, what is claimed as new and desired to be secured by Letters Patent is:

1. In a blower pipe for spreading mulch fibres and other materials capable of being air borne, a nozzle assembly at the discharge end of said pipe comprising a tubular housing provided with a plurality of spaced nozzle holders disposed at such an angle to the flow axis of the pipe that the longitudinal axes thereof slope in the direction of flow and converge towards the flow axis of the pipe, nozzle members removably supported in said holders and provided with orifices at their inner ends so shaped as to effect spreading of material issuing therefrom into streams that converge adjacent the outlet of said housing, and means for supplying said nozzles with fluid material under pressure, the material issuing through said orifices as a fog or spray.

2. A nozzle assembly as in claim 1 in which a deflector is rotatably mounted at the discharge end of the pipe and forwardly of the nozzles for controlling the extent and the direction of carry of the air borne materials.

3. In a blower pipe for spreading mulch fibres and other materials capable of being air borne, a nozzle assembly at the discharge end of said pipe provided with a plurality of spaced nozzle holders disposed at such an angle to the flow axis of the pipe that the longitudinal axes thereof slope in the direction of flow and converge toward the flow axis of the pipe, a pipe coupling removably secured within each holder, a nozzle coupled to the inner end of each of the couplings and a liquid supply means connected to the outer ends of said couplings.

4. A nozzle assembly as in claim 3 in which a tubular nozzle housing is secured to the discharge end of the blower pipe and that the nozzle holders are secured to said nozzle housing.

5. A nozzle assembly attachment for the discharge end of a blower pipe through which air borne materials such as fibres and particulate material may be propelled and discharged, the nozzle assembly comprising a tubular housing having an annular flange at one end for receiving the discharge end of the blower pipe, tubular nozzle holders mounted on said housing, said holders being inclined at an acute angle to the housing, a hollow coupling member in each holder, means for removably securing the said coupling in the holder, a nozzle member threaded into the inner end of each coupling and means connected to the outer end of each nozzle coupling for supplying the nozzles with flowable materials such as adhesives and liquids, the nozzles discharging such materials within and into the major flow area of the housing.

6. A nozzle assembly as in claim 5 in which the housing is provided with a deflector at the outlet thereof, there being means for adjusting the deflector from a position of non-interference with flow from the outlet of the housing to positions where the direction of flow from said outlet is changed.

References Cited in the file of this patent

UNITED STATES PATENTS

| | | |
|---|---|---|
| 540,102 | Kirshman | May 28, 1895 |
| 1,718,507 | Wenzel | June 25, 1929 |
| 1,800,003 | Allstott | Apr. 7, 1931 |
| 1,882,377 | Whittelsey | Oct. 11, 1932 |
| 2,091,055 | Roselund | Aug. 24, 1937 |